(12) United States Patent
Gerhaher

(10) Patent No.: US 6,888,452 B1
(45) Date of Patent: May 3, 2005

(54) METHOD AND APPARATUS FOR WARNING A FOLLOWING VEHICLE DURING BRAKING

(75) Inventor: Max Gerhaher, Landau/Isar (DE)

(73) Assignee: Christiane Gerhaher (DE)

( * ) Notice: Subject to any disclaimer, the term of this patent is extended or adjusted under 35 U.S.C. 154(b) by 612 days.

(21) Appl. No.: 09/645,453

(22) Filed: Aug. 24, 2000

(30) Foreign Application Priority Data

Aug. 24, 1999 (DE) ......................................... 199 40 080

(51) Int. Cl.[7] ................................................. B60Q 1/44
(52) U.S. Cl. .................... 340/479; 340/463; 340/309.3; 340/464; 340/468; 340/467
(58) Field of Search ................................ 340/479, 463, 340/467, 309.3, 464, 468

(56) References Cited

U.S. PATENT DOCUMENTS

| | | | | |
|---|---|---|---|---|
| 4,663,609 A | * | 5/1987 | Rosario | 340/479 |
| 4,990,887 A | * | 2/1991 | Lee | 340/479 |
| 5,150,098 A | * | 9/1992 | Rakow | 340/479 |
| 5,172,095 A | * | 12/1992 | Scott | 340/479 |
| 5,231,373 A | * | 7/1993 | Freeman et al. | 340/469 |
| 5,594,416 A | | 1/1997 | Gerhaher | |
| 5,663,707 A | * | 9/1997 | Bartilucci | 340/464 |
| 5,801,624 A | * | 9/1998 | Tilly et al. | 340/479 |
| 5,886,628 A | * | 3/1999 | Alhassoon | 340/479 |
| 6,133,852 A | * | 10/2000 | Tonkin | 340/903 |
| 6,268,792 B1 | * | 7/2001 | Newton | 340/467 |

FOREIGN PATENT DOCUMENTS

| | | |
|---|---|---|
| DE | 31 19 386 A1 | 12/1982 |
| DE | 40 14 916 | 11/1991 |
| DE | 199 40 080 | 11/1991 |
| DE | 39 42 151 C2 | 5/1992 |
| DE | 42 28 972 A1 | 3/1994 |
| DE | 43 05 186 | 8/1994 |
| GB | 2226875 | 7/1990 |

\* cited by examiner

*Primary Examiner*—Daniel J. Wu
*Assistant Examiner*—Tai T. Nguyen
(74) *Attorney, Agent, or Firm*—Robert W Becker & Associates; Robert W Becker

(57) ABSTRACT

A method and apparatus for warning a following vehicle when a vehicle in front applies its brakes are provided. At least one brake light of a vehicle illuminates during a braking process as the braking value increases in conformity with a present value of the braking value. After the value drops below the maximum value, the illumination continues for a retention time that is a function of the braking process, and after the conclusion of the retention time fades during a period of time that is a function of the braking process.

18 Claims, 1 Drawing Sheet

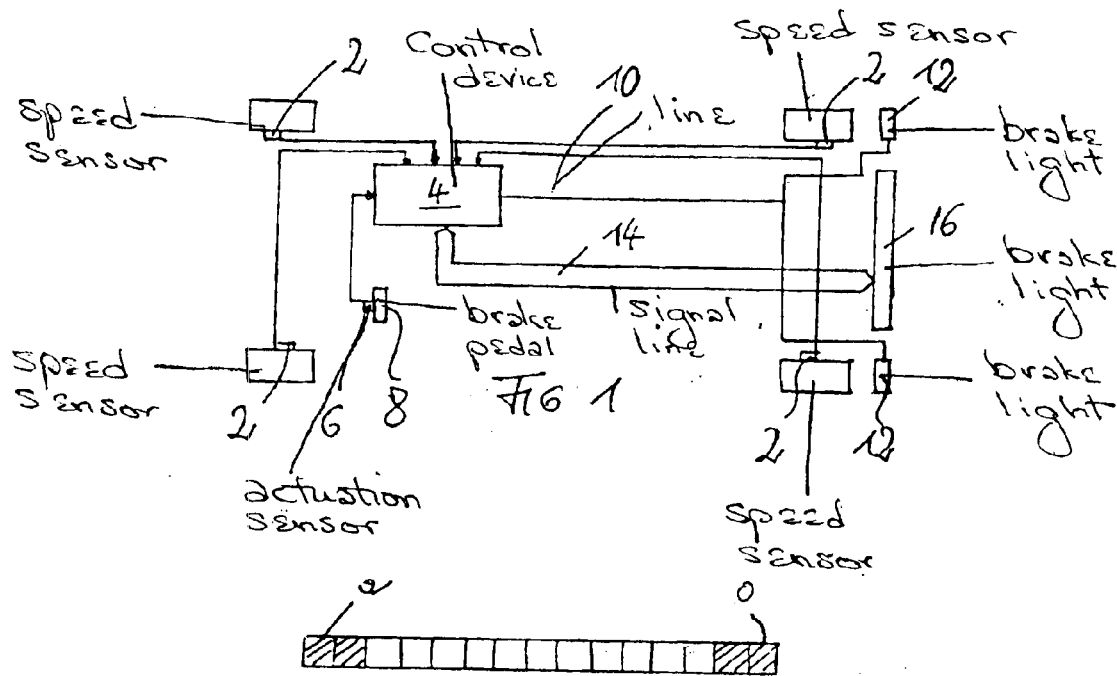
FIG 1
FIG 2
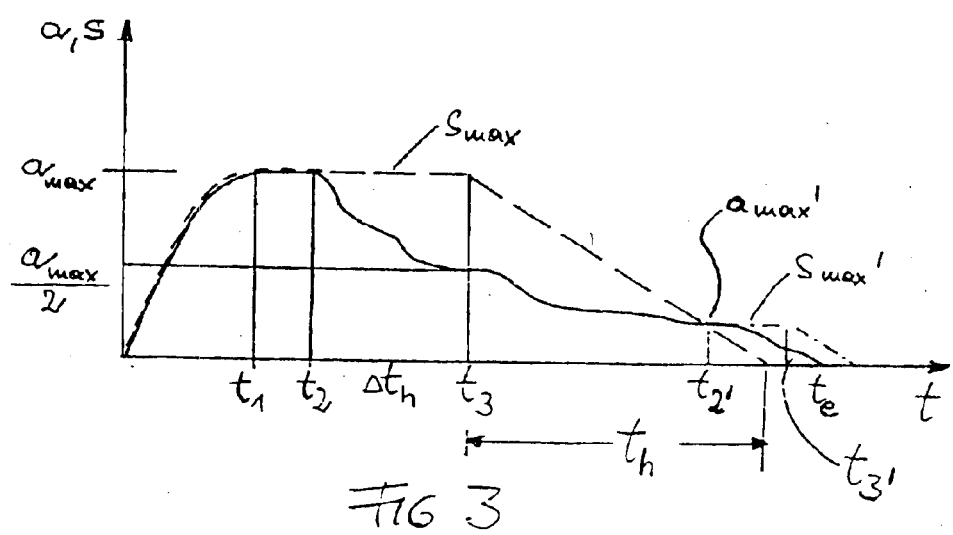
FIG 3

METHOD AND APPARATUS FOR WARNING A FOLLOWING VEHICLE DURING BRAKING

BACKGROUND OF THE INVENTION

The present invention relates to a method and apparatus for warning a following vehicle when a vehicle in front, a leading vehicle, applies its brakes.

DE 43 05 186 C2 (U.S. Pat. No. 5,594,416) discloses a method for reducing the danger of rear end accidents in traffic via a deceleration warning; this document also discloses a deceleration warning system. During a braking process, an integral is formed via the deceleration, and as a result a danger value is calculated in conformity with which the signal aspect or pattern of a brake light is affected. After conclusion of a deceleration, the brake light is not immediately extinguished; rather, the lights thereof fade in conformity with a predetermined function or equation. A characteristic of such integral brake lights is that short, pronounced decelerations of the leading vehicle are only presented after a time delay that is due to the integration; this can lead to dangerous situations if traffic is heavy.

Methods for warning a following vehicle are also known where one or more brake lights of a leading vehicle are illuminated in conformity with the present deceleration, and in particular proportionally to the present deceleration. In this connection, the size of the illuminating surface and/or light intensity thereof can vary in conformity with the present deceleration. Such proportionally controlled brake lights generally extinguish immediately after conclusion of the deceleration. A characteristic of the brake lights that illuminate proportionally to the deceleration is that their signal pattern is very uneven due to the deceleration, which generally rapidly varies during a braking process. Furthermore, they draw considerable attention of the driver of a following vehicle even if the braking of the leading vehicle does not present a great danger, for example during very brief, intense decelerations that do not lead to significant reductions in speed. In contrast, at the conclusion of a lasting deceleration, there is no longer a warning, although the braking vehicle presents a great danger to the following vehicle, which is still driving faster.

It is therefore an object of the present invention to provide a method and an apparatus for warning a following vehicle when a vehicle in front applies its brakes, whereby the aforementioned drawbacks are to be overcome and an effective measure is to be provided for reducing rear end accidents.

BRIEF DESCRIPTION OF THE DRAWING

This object, and other objects and advantages of the present invention, will appear more clearly from the following specification in conjunction with the accompanying schematic drawing, in which:

FIG. 1 is a simplified block diagram of one exemplary embodiment of the inventive warning apparatus;

FIG. 2 is a view upon a brake light;

FIG. 3 shows curves for explaining the function of the present invention.

SUMMARY OF THE INVENTION

The method of the present invention is characterized primarily by:

causing at least one brake light of the leading vehicle to illuminate during a braking process, as a braking value of the braking process increases, in conformity with a present value of the braking value;

causing illumination to last for a retention time that is a function of the braking process in conformity with a maximum value of the braking value after such value drops below the maximum value; and causing the illumination to fade, after conclusion of the retention time, during a period of time that is a function of the braking process.

The method of the present invention is characterized in that during the braking process, at least as long as a characteristic braking value does not drop, the signal pattern of the brake light, and hence the warning thereof, is provided by the maximum value of the braking value. If the value drops below this maximum braking value, then despite the decreasing braking value the braking lights initially continue to illuminate in a non-modified manner during a retention time, and are then extinguished within a fading time that is a function of the braking process. The characteristic braking value can relate to the vehicle deceleration, the braking pressure, the actuation force of a brake pedal, the actuation path of the brake pedal, or some other value that is characteristic for the braking process.

With the inventive method, an easy to comprehend warning is generated that corresponds to the danger represented for a following vehicle by a vehicle in front that is applying its brakes. In addition, the method of the present invention is straightforward and economical.

The apparatus of the present invention is characterized primarily by at least one brake light, for the leading vehicle, having a variable signal pattern; a control device having a computer; and means for conveying to the control device at least one present braking value that characterizes a braking process, wherein the computer calculates a control value such that the at least one brake light will be illuminated and will fade in conformity with the method of the present invention.

During the fading duration, the control value that determines the fading can be compared with a control value that corresponds with an illumination of the brake light in conformity with the respective momentary braking value, and such momentary braking value can be taken as the new maximum braking value if the control value that determines the fading is the same or less than the value corresponding to the momentary braking value. As a result, the warning provided by the brake light during a long lasting braking process in every case lasts beyond the conclusion of the vehicle deceleration, even if during a braking process a value is obtained that drops below a maximum braking value.

Further specific features of the present invention will be described in detail subsequently.

DESCRIPTION OF PREFERRED EMBODIMENTS

Referring now to the drawing in detail, as can be seen from the block diagram of FIG. 1 speed sensors 2 that are disposed on the wheels of a motor vehicle are connected to a control device 4 that in a manner known per se contains a microprocessor with pertaining memory. Connected to the control device 4 is an actuation sensor 6 that detects the actuation of a brake pedal 8. A line 10 leads from the control device 4 to conventional rear brake lights 12 that light up in a known manner as soon as the brake pedal 8 is actuated. In addition, a signal line 14 leads from the control device to a brake light 16 that extends over a portion of the width of the vehicle and pursuant to FIG. 2 is embodied as a band of lights or lamps composed of individual light emitting diodes a to o.

The construction and function of the individual components or groups of components are known and will therefore not be described in detail. The control can be modified in many different ways; for example, the control device 4 can be embodied in the form of several, decentralized control units, one of which controls an ABS braking system of the vehicle, another can control the drive train (engine and transmission), and a third one can control the electronics of the vehicle (lights, central locking mechanism, etc.). The individual control units can communicate with one another via a bus system. In the illustrated embodiment, an interface is disposed in the brake light 16 that with the aid of the data transmitted over the data line 14 activates the electronic switch associated with the individual light emitting diodes so that in conformity with the data sent over the signal line 14 more or fewer diodes of the brake light 16 light up. FIG. 2 illustrates a condition where the two outermost light emitting diodes at each end are illuminated.

The present invention, which is reflected, for example, merely in the programming of the microprocessor contained in the control device 4, or in individual hardware, will be explained with the aid of FIG. 3 as follows.

The solid curve represents for a braking process the deceleration "a" as a function of time "t". As can be seen, in the illustrated embodiment the deceleration "a" first increases sharply and reaches a maximum value $a_{max}$. Proceeding from the maximum value $a_{max}$, which is achieved at the point in time $t_1$, the maximum deceleration lasts until the point in time $t_2$, and then drops in a varying sharp manner to a value of zero, which is achieved at the point in time $t_e$, at which the braking process is concluded.

The dashed-line curve represents a control signal calculated in the control device 4 for activating the brake light 16. This control signal corresponds to the warning intensity that emanates from the brake light 16 in that, for example, the greater the control signal the more diodes are illuminated.

As can be seen, the control signal "s" follows the deceleration "a" as long as the latter rises (up to the point in time $t_1$) or remains constant (up to the point in time $t_2$). When the deceleration drops (after the point in time $t_2$), the control signal "s" first remains constant at its value $s_{max}$, which corresponds to the value $a_{max}$. The so-called retention time $\Delta t_h$, during which the control signal, and hence the signal aspect or pattern of the brake light 16, remains unaltered, is in the illustrated embodiment determined by the time interval between $t_2$ and $t_3$, whereby $t_3$ is that point in time at which the deceleration "a" has dropped to half of the maximum value. As soon as the point in time $t_3$ is reached, the control signal drops with a predetermined change in terms of time; in other words, in the illustrated embodiment light emitting diodes of the brake light 16 are increasingly extinguished.

In the embodiment illustrated in FIG. 3, the signal value "s" does not drop continuously to zero, but rather, starting at the point in time $t_{2'}$, again remains at a constant value $s_{max'}$, in order starting at the point in time $t_{3'}$ to drop to zero at the prescribed fading speed.

The point in time $t_{2'}$ occurs when the value of the control signal "s", which drops at a prescribed fading function, drops below the value that the control signal has corresponding to the acceleration "a" at the point in time $t_{2'}$. The intersection value $a_{max'}$ is taken as the new maximum value. The control signal remains at the corresponding value $s_{max'}$ up to the point in time $t_{3'}$, at which the deceleration has dropped to the value $a_{max'}/2$, and then drops in conformity with the predetermined fading function. In this way, the warning of the brake light 16 that corresponds to the control signal in each case lasts over the duration of the vehicle deceleration.

The functionality described can be realized by an appropriate programming of the microprocessor contained in the control device, and storage of the respective values $a_{max}$.

The coordination between the signal value "s" and the signal pattern of the brake light 16 can be such that with very high values of $a_{max}$, for example values that are in the vicinity of 10 m/s², all of the light emitting diodes illuminate or even flash, and as the signal value decreases an increasing number of light emitting diodes are extinguished starting from the middle of the brake light 16.

It is to be understood that other types of brake lights having a variable signal pattern can be utilized, for example brake lights the light intensity of which varies, the illumination surface of which varies in another fashion, etc. The outer brake lights 12, which in the embodiment of FIG. 1 have a conventional configuration, can also be drawn into the deceleration-dependent control in that, for example, their intensity or their surface can also be varied.

Many different possibilities exist for the coordination between deceleration and signal value or signal pattern of the brake light, for example, linear coordination, progressive coordination, diminishing coordination, etc.

The retention time $\Delta t_h$ can continue in a varied manner until the deceleration has dropped to more or less one-half of the maximum deceleration. In this connection, the vehicle speed at the beginning of the braking process (t=0) can additionally be taken into account at the point in time $t_1$ or even at the point in time $t_2$. The vehicle speed is always known by analyzing the speed signals of the wheel sensors. Furthermore, the control device 4 can be designed in such a way that upon activation of an ABS braking system (not illustrated; can be integrated in the control device 4), the vehicle deceleration "a" is set to a value of a=10 m/s², which represents a maximum value. In order not to take into account the ABS activation already when the braking of only one wheel is triggered by the ABS system, the system can be embodied in such a way that the ABS activation leads to establishment of the deceleration to a maximum value of 10 m/s² only if two wheels that are disposed diagonally relative to one another, or three or four wheels, are simultaneously triggered by the ABS system. This has the advantage that the signal pattern is influenced by the ABS system only if the roadway upon which the vehicle is driving is slippery all over.

To determine the vehicle speed, if this enters into the algorithm for determining the retention time and/or the fading function, the point in time can be selected at which the vehicle deceleration exceeds a predetermined threshold value, or that point in time at which the conventional brake light is activated by the brake pedal or the braking pressure.

The fading curve of the signal value "s", which in FIG. 3 is indicated linearly and which determines the extinction of the brake light, or in the case of FIG. 3 co-determines, can be determined according to very different points of view depending upon application. The fading function can be fixed in such a way that the fading time ta (the duration between $t_3$ and the dropping "s" to zero, in the event due to continuous deceleration a new value $s_{max'}$ is not set (FIG. 3)), is, for example, the function of $v_0$ and/or $a_{max}$, where $v_0$ is the speed at the beginning of a braking process, upon reaching the maximum acceleration or upon dropping below the maximum acceleration. For example: $t_{al}=kv_0$ or $t_a=ka_{max}$ or $t_a=kv_0 a_{max}$ $t_a=kv_0^x a_{max}^y$ or $t_a=k(v_0^x+a_{max}^y)$, or pursuant to some other function. The fading function can also be determined in such a way that the fading lime $t_a$ is a function of $v_0$, $a_{max}$ and $t_{0max}$, whereby $t_{0max}$ is the duration during which the maximum deceleration is present (duration between $t_1$ and $t_2$).

The iteration of the fading of "s" illustrated in FIG. 3 is not mandatory; for example, $t_3$ can be fixed such that "a" has already dropped to a small value, so that with a slowly decreasing fading function "s", the brake light in practical operation is then completely extinguished only after the deceleration has dropped to at least nearly zero.

It is to be understood that the system illustrated in FIG. 1 can be of a digital or also of an analog type, whereby the signal line 14 in an analog setting leads to a signal, the amplitude of which varies with the acceleration.

The specification incorporates by reference the disclosure of German priority document 199 40 080.6 of 24 Aug. 1999.

The present invention is, of course, in no way restricted to the specific disclosure of the specification and drawings, but also encompasses any modifications within the scope of the appended claims.

What I claim is:

1. A method of warning a following vehicle that a vehicle in front, a leading vehicle, has applied its brakes, the method comprising:
   in connection with each respective discrete application of said brakes of said leading vehicle during a braking process that results in a deceleration of said leading vehicle:
   (a) illuminating a brake light during a retention period of illumination such that said brake light displays a retention period visual format which is correspondingly indicative of the actual maximum rate of deceleration of said leading vehicle during the braking process,
   (b) during a fading period of illumination that commences at the end of said retention period of illumination, changing said retention period visual format of said brake light to a different visual format such that said brake light continues to be illuminated but has a different illuminated appearance during said fading period of illumination than its illuminated appearance during said retention period of illumination, said fading period of illumination having a prescribed blackout time at which the illumination of said brake light will cease, and
   (c) based upon a determined time at which said leading vehicle will come to a complete stop, alternatively (1) ceasing the illumination of said brake light at said prescribed blackout time in the event that said prescribed blackout time is not earlier than said determined time at which said leading vehicle will come to a complete stop or (2) delaying the time at which the illumination of said brake light will cease to a later blackout time which is no earlier than said determined time at which said leading vehicle will come to a complete stop in the event that said prescribed blackout time is earlier than said determined time at which said leading vehicle will come to a complete stop, whereby the actual time after an application of its brakes at which said leading vehicle will come to a complete stop will vary as a function of the speed of said leading vehicle and the manner of application of its brakes and the illumination duration of said brake light of said leading vehicle varies in correspondence with the actual time for said leading vehicle to come to a complete stop to ensure that said brake light remains illuminated until said leading vehicle comes to a complete stop.

2. A method according to claim 1, wherein, in connection with each braking process, as a function of the respective actual maximum rate of deceleration of said leading vehicle during the braking process.

3. A method according to claim 1, wherein said retention period of illumination ends generally when the rate of deceleration of said leading vehicle decreases from said actual maximum rate of deceleration of said leading vehicle.

4. A method according to claim 1, wherein said retention period ends when the instant rate of deceleration of said leading vehicle is generally one-half (½) said actual maximum rate of deceleration of said leading vehicle.

5. A method for illuminating at least one brake light during a braking operation, comprising:
   determining a momentary value of a braking value during the braking operation, wherein the braking value is a variable that is characteristic of the braking operation,
   causing the at least one brake light to be illuminated during the braking operation in accordance with the determined momentary braking value, wherein increasing momentary braking values are represented by increasing illumination of the at least brake light,
   determining a maximum momentary braking value achieved during the braking operation, and
   maintaining the illumination of the at least brake light unaltered in accordance with the determined maximum momentary braking value until the momentary braking value becomes equal to or less than a predetermined fraction of the determined maximum momentary braking value.

6. A method as in claim 5, further comprising causing said illumination of the at least one brake light to fade after the momentary braking value has become equal to or less than the predetermined fraction of the determined maximum momentary braking value, said fading occurring according to a predetermined fading function.

7. A method as in claim 6, further comprising:
   during said fading step, comparing a first control value representing the momentary braking value with a second control value representing the illumination of the at least one brake light,
   if the first control value is greater than the second control value, setting the momentary breaking value as a new determined maximum momentary braking value, and
   maintaining the illumination of the at least brake light unaltered in accordance with the new determined maximum momentary braking value until the momentary braking value becomes equal to or less than the predetermined fraction of the new determined maximum momentary braking value.

8. A method as in claim 5, wherein said braking value comprises a measured vehicle deceleration.

9. A method as in claim 5, further comprising detecting the speed of the vehicle at the beginning of the braking operation, wherein the at least one brake light is caused to be illuminated in accordance with a function of the said detected vehicle speed.

10. A method as in claim 5, wherein said predetermined fraction is about one-half.

11. A method as in claim 5, further comprising causing the at least one brake light to illuminate in accordance with a predetermined braking value upon detection of activation of an ABS system.

12. An apparatus adapted to illuminate at least one brake light during a braking operation, comprising:
   means for determining a momentary value of a braking value during the braking operation, wherein the braking value is a variable that is characteristic of the braking operation, means for causing the at least one brake light to be illuminated during the braking operation in accordance with the determined momentary braking value, wherein increasing momentary braking values are represented by increasing illumination of the at least brake light, means for determining a maximum momentary braking value achieved during the braking operation, and means for maintaining the illumination of the at least brake light unaltered in accordance with the determined maximum momentary braking value until the momentary braking value becomes equal to or less than a predetermined fraction of the determined maximum momentary braking value.

13. An apparatus as in claim 12, further comprising means for causing said illumination of the at least one brake light to fade after the momentary braking value has become equal to or less than the predetermined fraction of the determined maximum momentary braking value, said fading occurring according to a predetermined fading function.

14. An apparatus as in claim 13, further comprising:

means for comparing, during said fading step, a first control value representing the momentary braking value with a second control value representing the illumination of the at least one brake light, means for setting the momentary breaking value as a new determined maximum momentary braking value, if the first control value is greater than the second control value, and means for maintaining the illumination of the at least brake light unaltered in accordance with the new determined maximum momentary braking value until the momentary braking value becomes equal to or less than the predetermined fraction of the new determined maximum momentary braking value.

15. An apparatus as in claim 12, wherein said braking value comprises a measured vehicle deceleration.

16. An apparatus as in claim 12, further comprising means for detecting the speed of the vehicle at the beginning of the braking operation, and means for causing the illumination of the at least one brake light in accordance with a function of the said detected vehicle speed.

17. An apparatus as in claim 12, wherein said predetermined fraction is about one-half.

18. An apparatus as in claim 12, further comprising means for causing the at least one brake light to illuminate in accordance with a predetermined braking value upon detection of activation of an ABS system.

* * * * *